United States Patent
Persiani et al.

(10) Patent No.: US 10,730,386 B2
(45) Date of Patent: Aug. 4, 2020

(54) LID-CLOSING DEVICE WITH ROCKER

(71) Applicant: CEBI ITALY S.P.A., Dronero (CN) (IT)

(72) Inventors: Luigi Persiani, Osimo (IT); Alessandro Mazzocchini, Osimo (IT)

(73) Assignee: CEBI ITALY S.P.A., Dronero (CN) (IT)

( * ) Notice: Subject to any disclaimer, the term of this patent is extended or adjusted under 35 U.S.C. 154(b) by 318 days.

(21) Appl. No.: 15/554,187

(22) PCT Filed: Mar. 1, 2016

(86) PCT No.: PCT/IT2016/000050
§ 371 (c)(1),
(2) Date: Aug. 28, 2017

(87) PCT Pub. No.: WO2016/139690
PCT Pub. Date: Sep. 9, 2016

(65) Prior Publication Data
US 2018/0029469 A1  Feb. 1, 2018

(30) Foreign Application Priority Data
Mar. 2, 2015  (IT) .............................. AN2015A0032

(51) Int. Cl.
*B60K 15/05* (2006.01)
*E05C 19/02* (2006.01)
(Continued)

(52) U.S. Cl.
CPC .............. *B60K 15/05* (2013.01); *E05B 83/34* (2013.01); *E05C 19/022* (2013.01); *E05B 81/06* (2013.01); *E05B 81/40* (2013.01); *E05C 5/02* (2013.01)

(58) Field of Classification Search
CPC .......... E05B 83/34; E05B 81/06; E05B 81/40; E05B 83/28; E05B 2015/107;
(Continued)

(56) References Cited

U.S. PATENT DOCUMENTS 8,398,127 B2 * 3/2013 Persiani ................. B60K 15/05
                                                          292/163
8,870,242 B2 * 10/2014 Quijano ................ E05C 19/022
                                                          292/169
(Continued)

FOREIGN PATENT DOCUMENTS

WO        2008059543 A1    5/2008

OTHER PUBLICATIONS

International Search Report for corresponding International Application No. PCT/IT2016/000050.

*Primary Examiner* — Mark A Williams
(74) *Attorney, Agent, or Firm* — Egbert, McDaniel & Swartz, PLLC

(57) ABSTRACT

A lid-closing device has a rototranslating pin stressed by a spring, mounted in a box and having a head adapted to hook a hook of a lid, and a rocker pivoted in the box and connected to the rototranslating pin and to a heart-shaped cam. The rocker is completely rigid and not flexible and is pivoted in the box in such manner to leave clearance in order to permit the rocker to translate so that the follower of the rocker can follow the tracks of the heart-shaped cam. Springs are disposed between a lateral wall of the box and the rocker to compensate and dampen the translation of the rocker.

10 Claims, 6 Drawing Sheets

(51) Int. Cl.
*E05B 83/34* (2014.01)
*E05B 81/06* (2014.01)
*E05B 81/40* (2014.01)
*E05C 5/02* (2006.01)

(58) Field of Classification Search
CPC ............ E05B 2047/0023; B60K 15/05; B60K 2015/0576; E05C 19/022; E05C 19/02; E05C 19/165; Y10T 292/0977; Y10T 292/0837; Y10T 292/084; Y10T 292/1005; Y10T 292/101; E05Y 2900/534; E05Y 2201/10
See application file for complete search history.

(56) References Cited

U.S. PATENT DOCUMENTS

| | | | | |
|---|---|---|---|---|
| 9,493,967 | B2 * | 11/2016 | Basavarajappa | B60K 15/05 |
| 2010/0045049 | A1 * | 2/2010 | Persiani | B60K 15/05 |
| | | | | 292/14 |
| 2014/0251036 | A1 * | 9/2014 | Ishiguro | B60K 15/05 |
| | | | | 74/55 |
| 2017/0182882 | A1 * | 6/2017 | Persiani | B60K 15/05 |
| 2017/0306665 | A1 * | 10/2017 | Sonobe | E05B 83/34 |

* cited by examiner

LID-CLOSING DEVICE WITH ROCKER

The present patent application for industrial invention relates to an opening and closing device for lids, with particular reference to lids of fuel tanks in cars and motor vehicles.

"Push-push" locks for lids are known, wherein the lid is opened and closed by means of pushing. By pressing a closed lid, the lid is automatically released from the hook used to hook it to the lock. By closing an open lid until it is pressed against the lock, the lid is automatically hooked to the lock.

"Push-push" locks are provided with a rototranslating pin that acts as hooking means for the lid. Numerous actuation systems of the rototranslating pin are known.

WO2008/059543, in the name of the same applicant, discloses a lid-closing device, wherein the rototranslating pin is moved by a partially flexible rocker. The rocker is provided with a fork connected with the rototranslating pin and with a follower or tappet coupled in a heart-shaped cam. The follower is supported by a flexible arm of the rocker, in such manner that the arm can bend and the follower can follow the track of the heart-shaped cam. Instead, the fork of the rocker is rigid to allow for stable coupling with the rototranslating pin.

Nevertheless, such a rocker structure is impaired by some constructional and structural drawbacks.

In fact, the flexibility of a portion of the rocker does not allow for an efficient transmission of the motion between the rocker and the rototranslating pin.

Moreover, such a lever is obtained by casting two different materials with different thickness:
- a rigid material with high thickness for the fork and
- a flexible material with low thickness for the support arm of the follower.

Consequently, the production costs of such a rocker are high.

The assembly of the rocker provides for pivoting a cylindrical pin of the rocker in a cylindrical housing. Half of the semi-cylindrical housing is obtained in a box and half of the semi-cylindrical housing is obtained in a lid. The box and the lid are welded together in such manner that the pivoting pin of the rocker is disposed in the housing. However, the coupling of the pivoting pin of the rocker will change according to the way in which the box and the lid are welded, consequently changing the accuracy of the mechanism.

Also the construction of the follower connected to the rocker is complicated because the follower must be shaped as a roller that rolls in the heart-shaped cam.

The purpose of the present invention is to eliminate the drawbacks of the prior art by disclosing a lid-closing device with rocker that is inexpensive, simple to make and install, reliable and efficient at the same time.

These purposes are achieved according to the invention, with the characteristics claimed in the independent claim 1.

Advantageous embodiments of the invention appear from the dependent claims.

The lid-closing device according to the invention comprises:
- a box,
- a rototranslating pin mounted in the box in such manner to make rototranslations around an axis that coincides with the axis of the rototranslating pin, said rototranslating pin being provided with a head intended to hook a hook of a lid,
- an ejection spring that pushes said rototranslating pin,
- a heart-shaped cam pivoted in said box, said heart-shaped cam being provided with tracks forming a substantially heart-shaped closed circuit, and
- a rocker pivoted in said box with a pivoting axis orthogonal to said axis of the rototranslating pin, said rocker having a fork disposed at a first end of the rocker that engages with said rototranslating pin and a follower disposed at a second end of the rocker that slides in the tracks of the heart-shaped cam.

The rocker is completely rigid and not flexible and is pivoted in said box in such manner to leave clearance in order to permit the rocker to translate along the pivoting axis so that the follower of the rocker can follow the tracks of the heart-shaped cam.

The closing device also comprises spring means disposed between a lateral wall of the box and the rocker to compensate and dampen the translation of the rocker along said pivoting axis of the rocker.

The advantages of the closing device of the invention are evident. The provision of a completely rigid rocker ensures a more stable hooking with the rototranslating pin, a more reliable coupling of the follower with the heart-shaped cam, while simplifying at the same time the production of the rocker.

Further characteristics of the invention will appear manifest from the detailed description below, which refers to merely illustrative, not limiting, embodiments, illustrated in the attached drawings, wherein.

Figure 1:
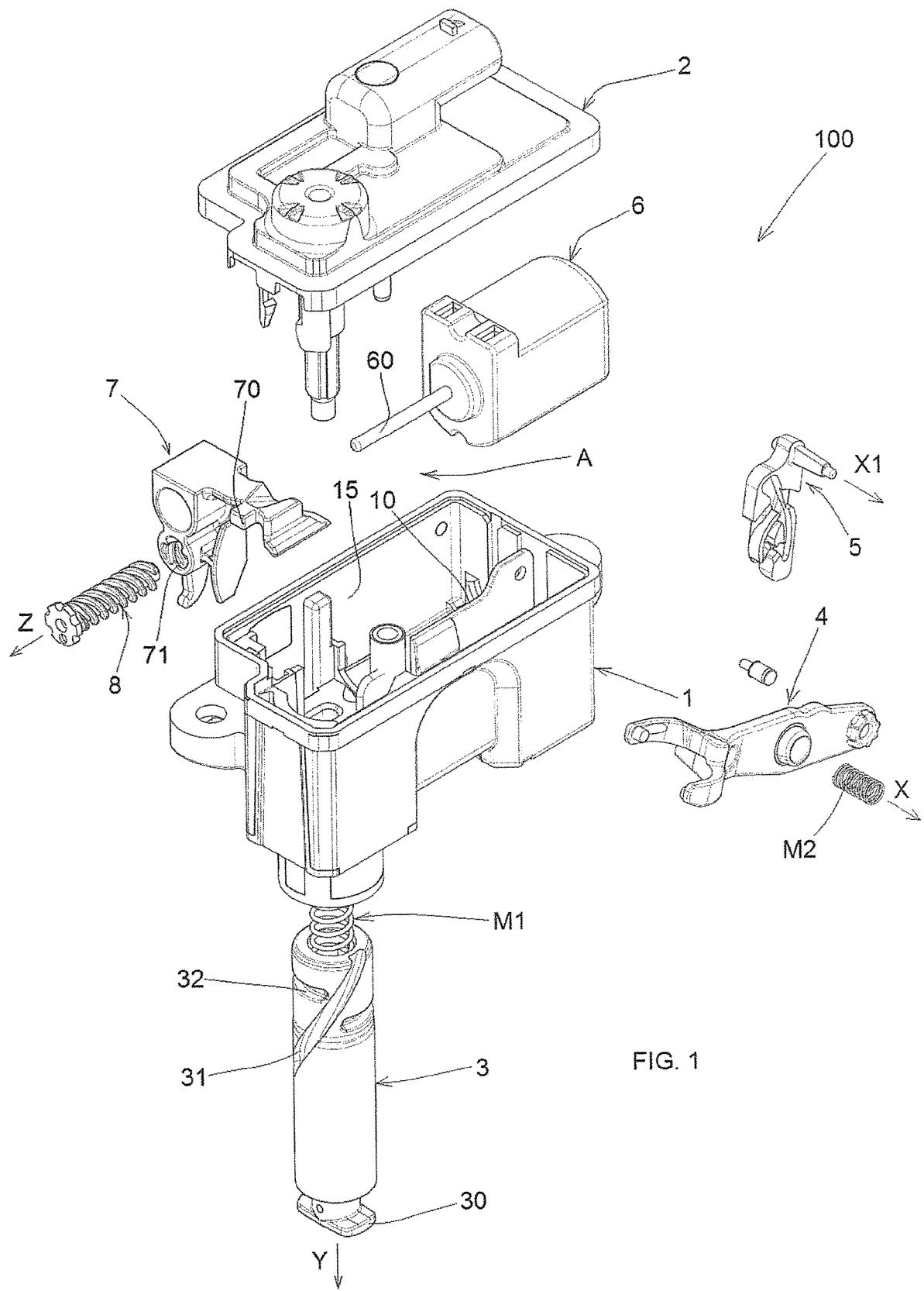
FIG. 1 is an exploded perspective view of the closing device according to the invention.

With reference to the figures, the closing device of the invention is disclosed, being generally indicated with reference numeral (100).

The closing device (100) comprises a box (1) closed with a lid (2). The box (1) houses a mechanism of a "push-push" lock. The mechanism comprises: a rototranslating pin (3), a rocker (4), and a heart-shaped cam (5). The rocker (4) is connected to the rototranslating pin (3) and to the heart-shaped cam (4).

The rototranslating pin (3) is mounted in the box (1) in such manner to protrude shortly from the box (1). The rototranslating pin (3) ends with a head (30) with "T"-shaped cross-section, which is intended to hook a hook of a lid (not shown in the drawings).

The head (30) of the rototranslating pin always remains outside of the box (1) during the rototranslation of the rototranslating pin (3). The rototranslating pin (3) has a helical groove (31) shaped as a long-pitch thread, which is intended to be engaged by a projection (not shown) obtained in the box (1) to guide a rototranslation of the rototranslating pin (3).

The rototranslating pin (3) is subject to the thrust of an ejection spring (M1) housed in the box (1) and disposed between the lid (2) and one end of the rototranslating pin (3).

The rototranslating pin (3) has a tubular structure and the ejection spring (M1) is inserted and hidden inside the rototranslating pin (3).

Figure 2:
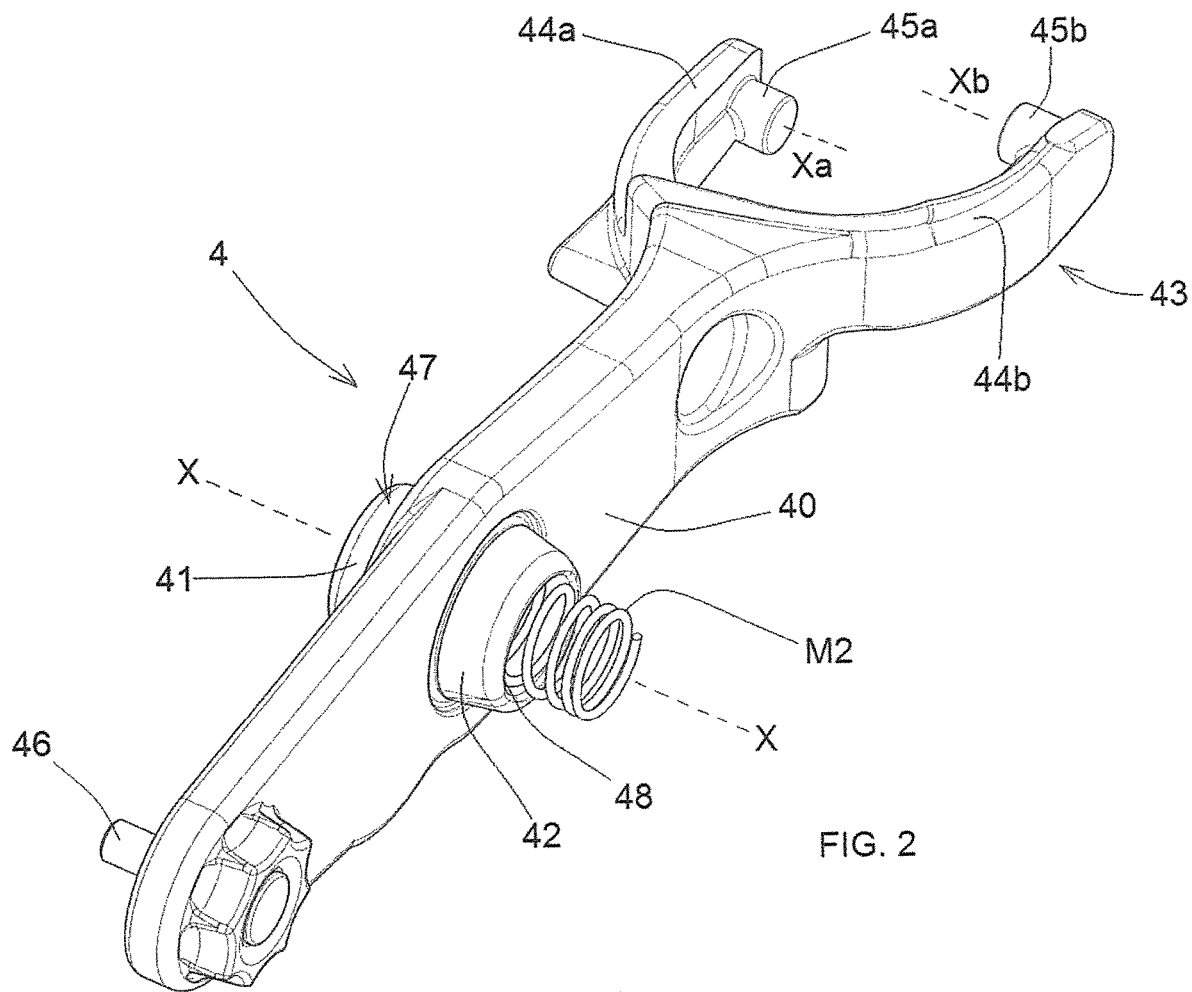
FIG. 2 is a perspective view of a rocker of the closing device of FIG. 1.

With reference to FIG. 2, the rocker (4) comprises a rod (40). A first shank (41) and a second shank (42) protrude from the rod (40) in opposite directions. The shanks (41, 42) must act as pivot of the lever and are basically disposed at half of the length of the rod (40) in such manner to generate a first class lever. The shanks (41, 42) have an axis (X) that corresponds to the pivoting axis of the rocker (4).

Figure 5:
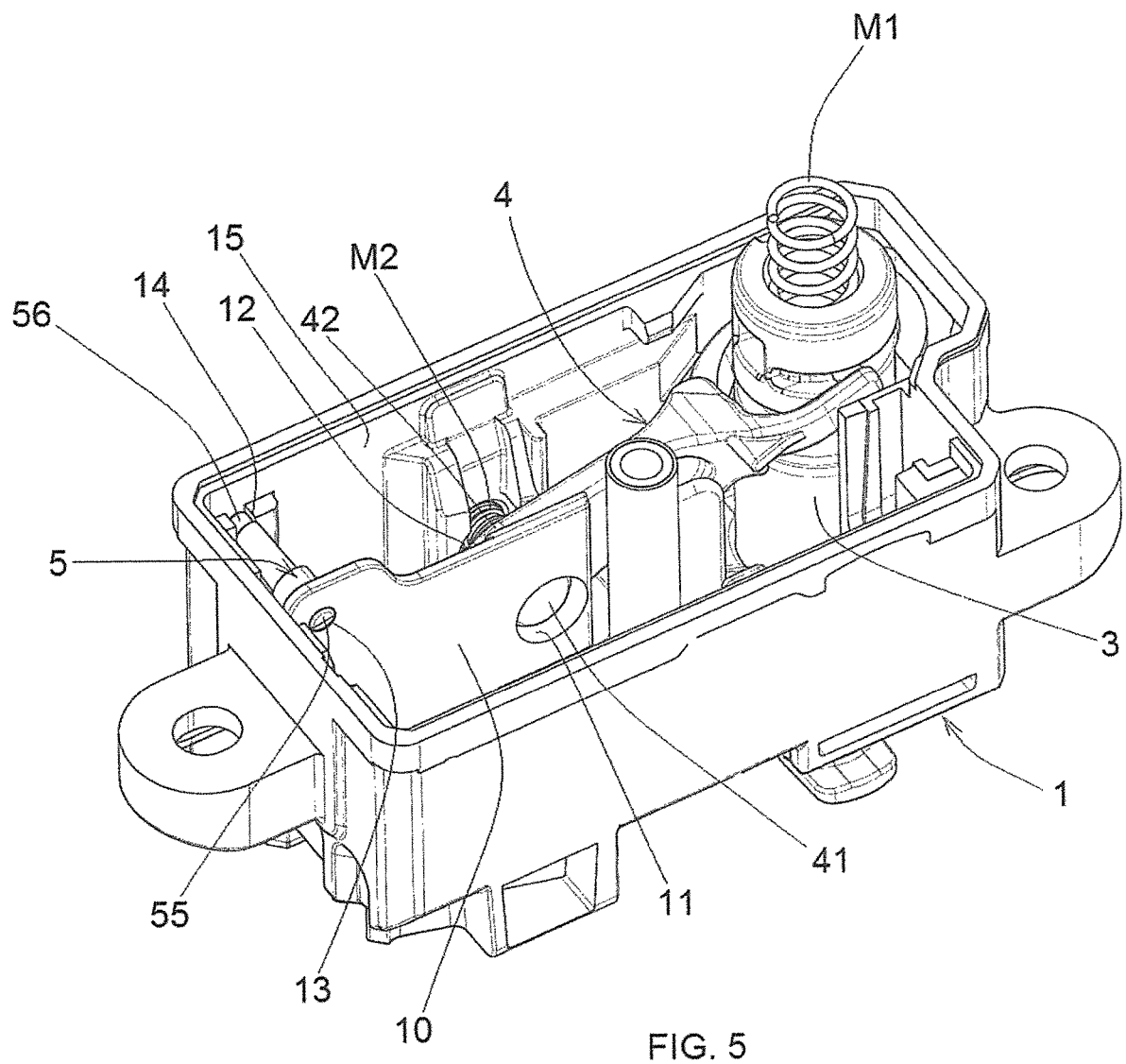
FIG. 5 is a perspective view of the rocker and the heart-shaped cam assembled in a box of the closing device of FIG. 1.
Figure 6:
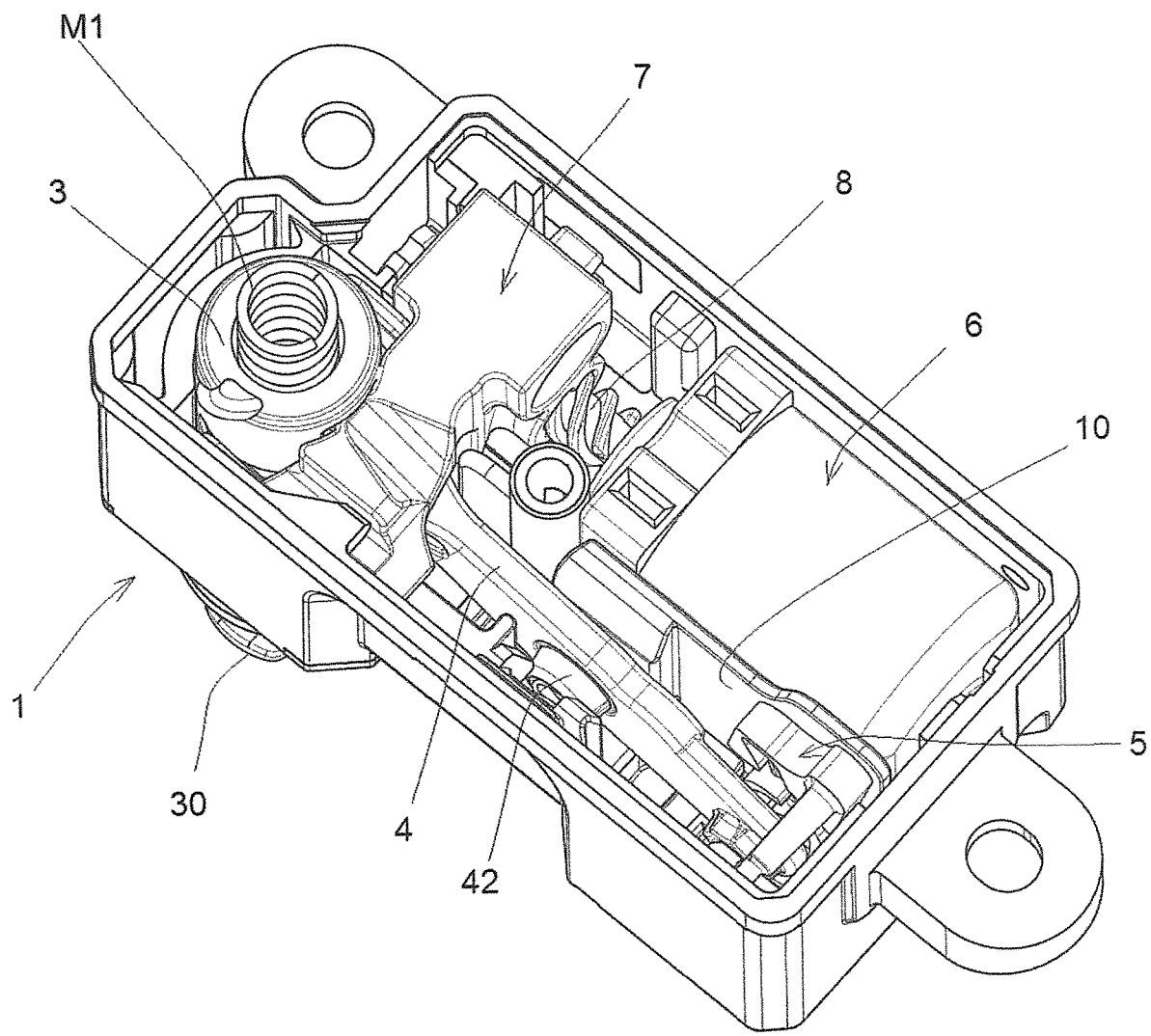
FIG. 6 is the same view as FIG. 5, wherein also a motor and a slide are mounted in the box.

With reference to FIG. 5, the box (1) comprises an intermediate wall (10) that stands out from the bottom of the box and is longitudinally disposed along a center line of the box. A first seat (11) intended to revolvingly receive the first shank (41) of the rocker is obtained in the intermediate wall.

A second seat (12) in opposite position to the first seat (11) of the box is obtained in a lateral wall (15) of the box (1). The second seat (12) of the box revolvingly receives the second shank (42) of the rocker.

The shanks (41, 42) of the rocker are received in the corresponding seats (11, 12) of the box with clearance in the direction of the axis (X) of the shanks. Spring means (M2) are disposed in the second seat (12) of the box, between the lateral wall (15) of the box and the second shank (42) of the rocker. The spring means (M2) preferably consist in a helical spring. In view of the above, the rocker (4) can rotate around the axis (X) of the shanks and can also translate in the direction of the axis (X).

Figure 7:
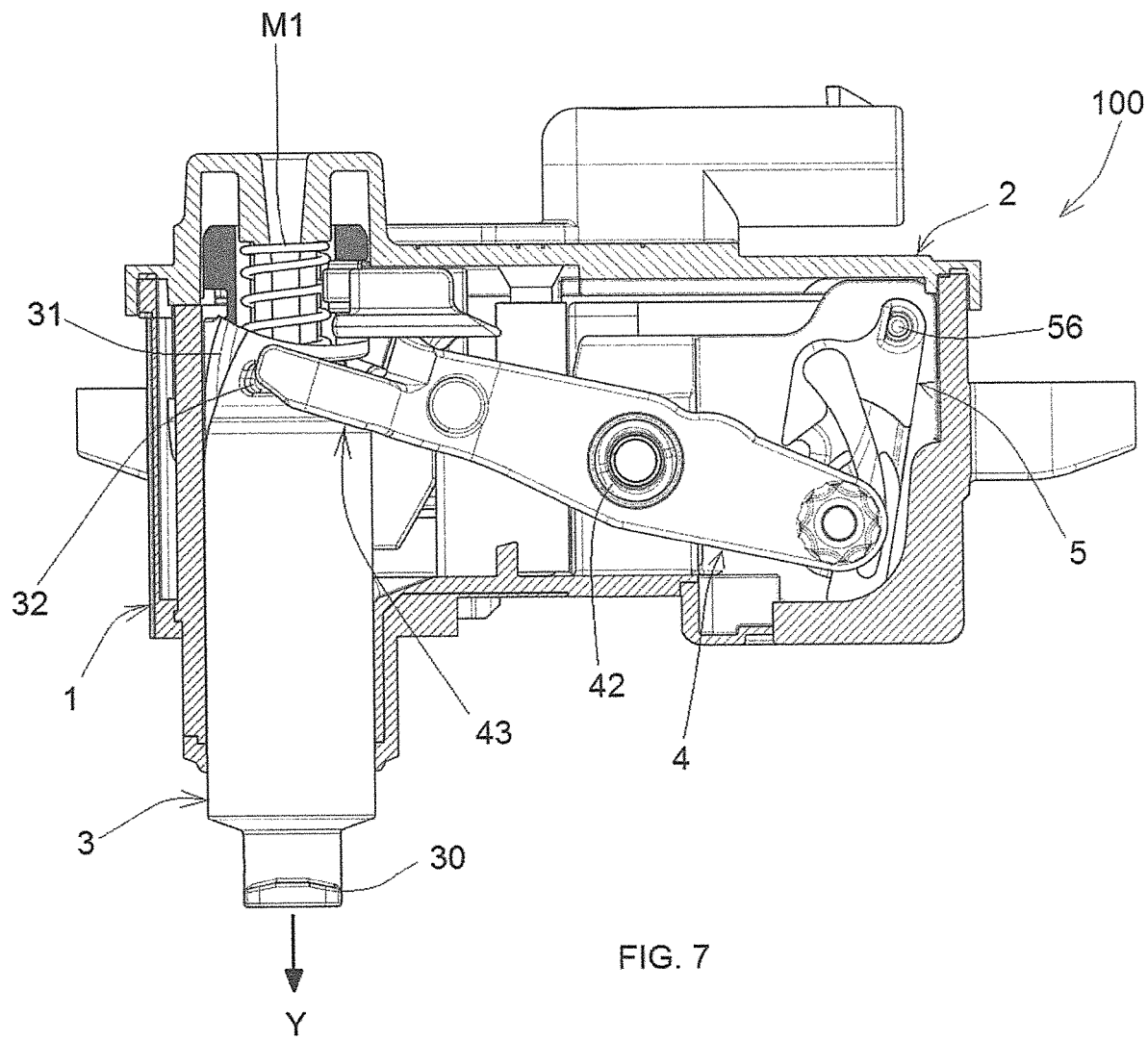
FIG. 7 is a partially sectional side view of the closing device of FIG. 1 after assembly.

It must be considered that the rototranslating pin (3) has an axis (Y) (see FIG. 7) and translates in the direction of its axis (Y). Instead, the rocker (3) rotates around its pivoting axis (X). The pivoting axis (X) of the rocker is orthogonal to the axis (Y) of the rototranslating pin.

Advantageously, the first shank (41) of the rocker has a rounded head (47) and also the first seat (11) in the intermediate partition of the box is suitably rounded in such manner to generate a spherical coupling intended to compensate any type of movement of the rocker.

Advantageously, the second shank (42) has a recessed housing (48) to receive one end of the spring (M2)

A "U"-shaped fork composed of two arms (44a, 44b) is provided at one first end of the rod (40) of the rocker. A pin (45a, 45b) directed towards the interior of the fork is provided at the end of each arm (44a, 44b) of the fork. In particular, the arms (44a, 44b) lie on different planes, meaning that the first arm (44a) lies on a lower plane with respect to the plane whereon the second arm (44b) lies. Consequently, the pins (45a, 45b) are not aligned. The first pin (45a) has an axis (Xa) and the second pin (45b) has an axis (Xb). The axes (Xa, Xb) of the pins are mutually parallel as well as parallel to the pivoting axis (X) of the rocker, but the axes (Xa, Xb) of the pins are not coinciding.

Going back to FIG. 1, the rototranslating pin comprises a semi-annular groove (32) that does not interfere with the helical groove (31). The semi-annular groove (32) has a helical shape with different direction with respect to the one of the helical groove (31). The helix of the semi-annular groove (32) has a much lower pitch than the helix of the helical groove (31). The pins (45a, 45b) of the fork of the rocker are engaged in the semi-annular groove (32) of the rototranslating pin. In this way, the rototranslating pin is firmly connected to the rocker. A follower (46) shaped as a tip protruding from the rod (40) with the same direction as the first shank (41) is provided at a second end of the rod (40) of the rocker. The rocker (4) has a hole wherein the follower (46) is inserted.

The rocker is preferably obtained from aluminum casting. However, it must be considered that the aluminum casting technology, such as sintering, does not allow for making any undercuts. Instead, undercuts are normally obtained with plastic molding.

For this reason, the rocker (4) is obtained with staggered arms (44a, 44b) (and consequently also the pins (45a, 45b) are staggered). When looking at a side view of the rocker, no hidden elements are present, and this means that no undercut elements are present. This characteristic is important because the part can be molded (mold opening/closing) in the direction of the axis (X) of rotation of the rocker.

By molding along this direction, the part comes out from the mold with the following molded elements:
  the recessed housing (48) of the second shank (42) to receive the spring (M2),
  the hole for the pin that forms the follower (46) and
  the two pins (45a, 45b) of the fork.

In this way no additional machining operations are needed.

Although the rocker is preferably obtained from aluminum casting in order to obtain a high mechanical performance, the rocker can be also obtained from casting other zinc alloys (Zamak®), which are less expensive than aluminum, or hard plastics in order to reduce costs.

Instead, in order to obtain a higher performance and accuracy, the rocker (4) can be obtained from metal powder sintering.

Figure 3:
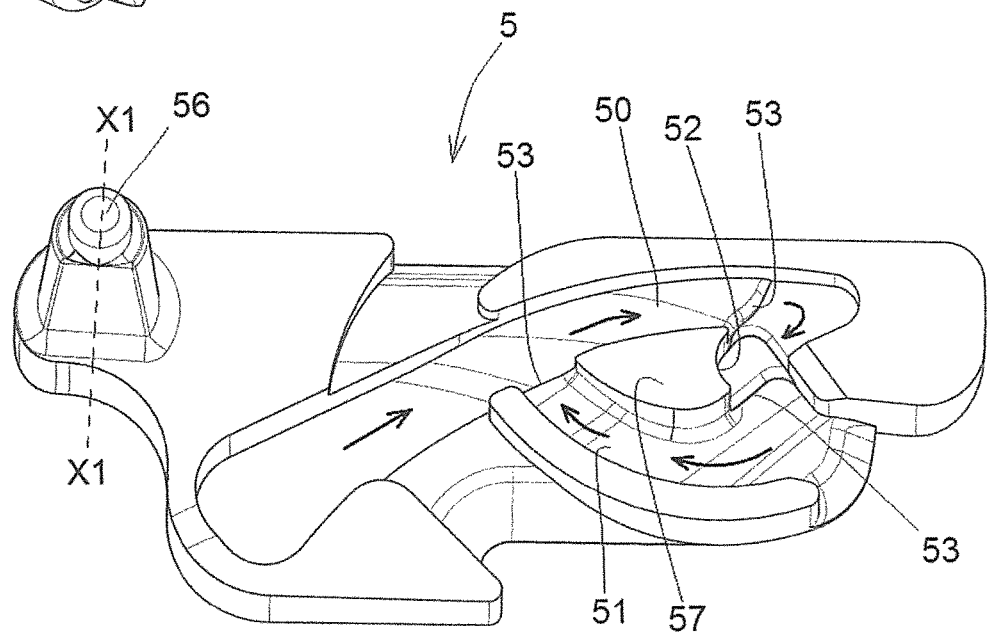
FIG. 3 is a top view of a heart-shaped cam of the closing device of FIG. 1.

With reference to FIG. 3, the heart-shaped cam (5) consists in a plate with a central island (57) that defines two side-by-side tracks (50; 51), which are joined in such a way to form a heart-shaped closed circuit, wherein the follower (46) of the rocker slides in one direction only (indicated by the arrows in FIG. 3).

The bottom surface of the first track (50) is provided with a series of ascending inclined planes ending in a "U"-shaped housing (52) obtained in the central island (57). The second track (51) branches off from the housing (52), being provided with a series of slides and descending steps (53). Consequently, the follower (46) sliding inside the circuit of the heart-shaped cam has a forced traveling direction, given that the follower (46) cannot go beyond the steps (53), must always descend along the slides and the steps (53) of the second track (51) and climb the ascending inclined planes of the first track (50) again.

Figure 4:
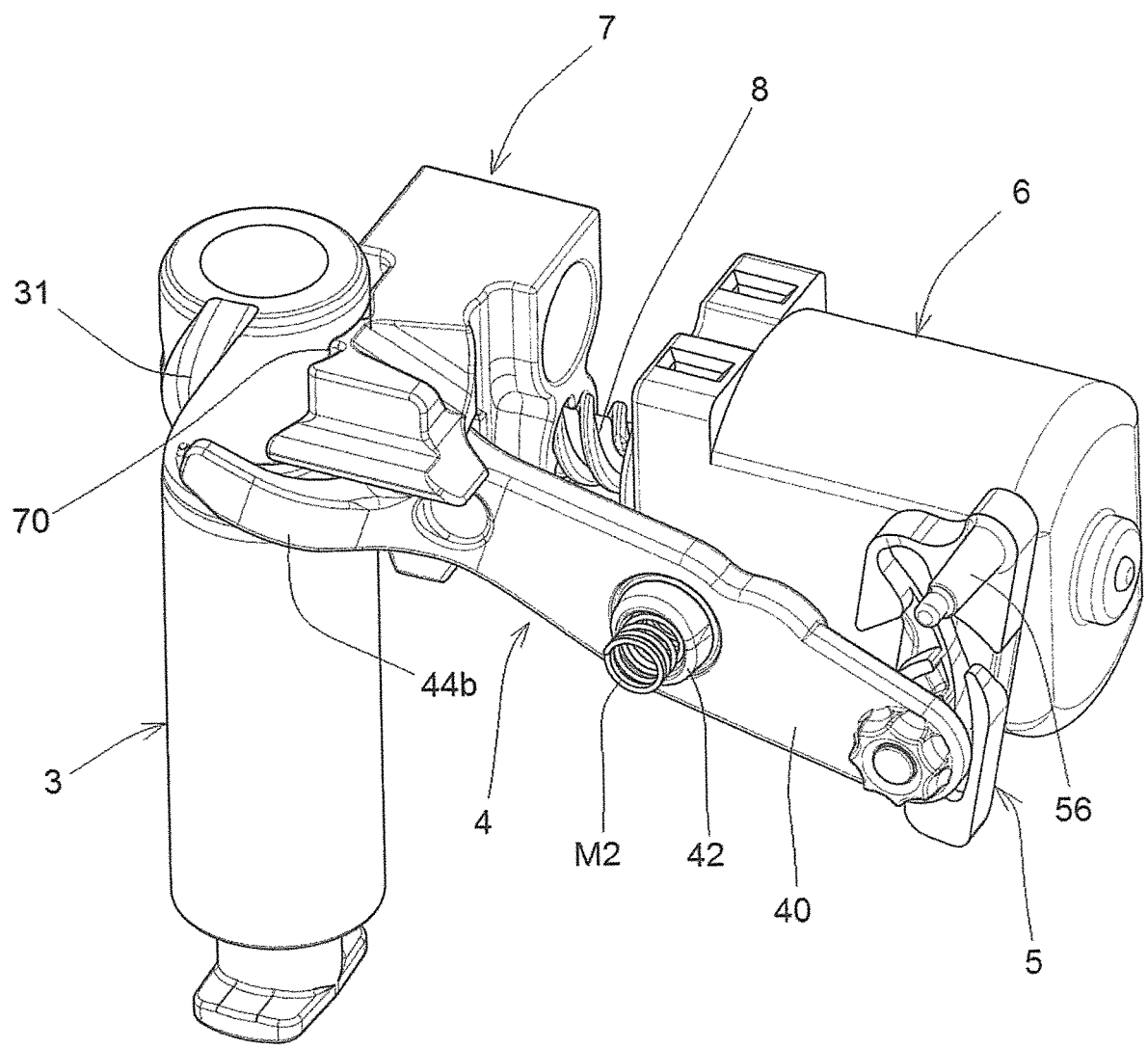
FIG. 4 is a perspective view of some parts of the closing device of FIG. 1, after assembly.

With reference to FIG. 4, the heart-shaped cam (5) is disposed in the box (1) in side-by-side position to the intermediate partition (10) of the box. The heart-shaped cam (5) is free to make small oscillations to allow for the movement of the follower (46) of the rocker along the tracks (50, 51) of the heart-shaped cam (5). As a matter of fact, the follower (56) makes curvilinear travels shaped as an arc of circle with radius equal to the distance measured between the follower (56) and the axis (X) of the shanks (41, 42) of the rocker.

Therefore, the heart-shaped cam (5) must be in a condition to oscillate. To that end, the heart-shaped cam (5) comprises two pivoting pins (55, 56) (see FIG. 5) disposed in opposite directions. The pivoting pins (55, 56) of the heart-shaped cam are revolvingly engaged inside corresponding housings (13, 14) respectively obtained in the intermediate partition (10) and in the lateral wall (15) of the box (1).

The pivoting pins (55, 56) of the heart-shaped cam have an axis (X1) that is the pivoting axis of the heart-shaped cam. The pivoting axis (X1) of the heart-shaped cam (5) is parallel to the pivoting axis (X) of the rocker (4).

It must be noted that, because of the fact that the shanks (41, 42) of the rocker are housed in the seats (11, 12) of the box with clearance that allows the shanks (41, 42) to translate along the axis (X) of the shanks, the follower (46) of the rocker can rub against the ascending planes of the first track (50) of the heart-shaped cam and descend, still rubbing, along the descending planes and the steps (53) of the second track (51) of the heart-shaped cam. The spring means (M2) act as compensation and dampener for the translation movement along the axis (X) of the shanks (41, 42) of the rocker.

In view of the above, the rocker (4) is completely rigid in order not to transmit any transverse stress to the rototranslating pin (3). Moreover, the rocker can be made in one piece casting a rigid material, such as metal, for example aluminum.

The rocker (4) determines the position of the rototranslating pin (3) when the follower (46) of the rocker is engaged in the "U"-shaped housing (52) of the central island (57) of the cam. In order to reach this area of the cam, the follower (46) of the rocker must climb the inclined planes of the first track (50) of the cam and fall into the "U"-shaped housing (52) when it encounters a step.

It must be noted that the rocker disclosed in WO2008/059543 has a rigid part between the central pivot and the follower, and an elastic part between the central pivot and the fork. The elastic part allows the follower to translate climbing the various inclined planes and falling from the various steps of the heart-shaped cam.

Instead, the rocker (4) is completely rigid. Therefore, in order to allow the follower (46) to move in the heart-shaped cam (5), the rocker (4) must be able to make a movement. Such a movement of the rocker is a rotation of the entire rocker around the axis (Y) of the rototranslating pin (3).

Such a rotation of the rocker (4) would not be possible if the shanks (41, 42) forming the pivot of the rocker were cylindrical and inserted in cylindrical holes. Considering that the seats (11, 12) of the box must be cylindrical because of molding requirements, in order to allow the rocker to move, the two shanks (41, 42) forming the pivots of the rocker are given a truncated-conical shape. The more the rocker rotates with respect to the axis (Y) of the rototranslating pin, the more a truncated-conical wall of the shanks (41, 42) of the rocker will get closer to a cylindrical part of the seats (11, 12) of the box.

The rocker (4) obtained in one piece has the following advantages:
- the rocker is obtained from casting (rather than from shearing a sheet metal and casting it together with a flexible material);
- using the spring (M2) in the housing (48) of the shank (42) of the rocker, both the operation of the mechanism and the produced noise can be adjusted (20 dB less than the solution with a rocker made of two different materials);
- the rocker can be molded/cast from different materials: plastics, aluminum, zinc alloys (Zamak®) according to the application, thus minimizing costs;
- the one-piece rocker is stronger and more accurate than a rocker made of two different materials, the manufacturing process is simpler and there are less factors to control;
- the application of the follower (46) on the rocker is simply obtained by inserting a pin in a hole and it is not necessary to provide rolls rolling in the cam, thus resulting in a lower number of process controls;
- the seats (11, 12) used to receive the shanks (41, 42) of the rocker are obtained only in the box (1) and the shanks (41, 42) are fitted into the seats (11, 12). Therefore, the accuracy of the rocker movement is not affected by the welding between box and lid and an accurate operation is maintained throughout the life of the product.

Optionally, the closing device (100) may comprise a safety system that prevents the movement of the rototranslating pin (3). Such a safety system comprises an actuator (A) that can move from a closing position, wherein it interferes with the rototranslating pin (3), thus locking it, to an opening position, wherein it frees the movement of the rototranslating pin.

Such an actuator (A) comprises an electrical motor (6) that actuates in translation a slide (7) provided with a hook (70) intended to hook the rototranslating pin (3) in such way to lock it.

The electrical motor (6) has a shaft (60) whereon a screw (8) with an axis (Z) orthogonal to the axis (Y) of the rototranslating pin and to the pivoting axis (X) of the rocker is mounted. The screw (8) is engaged in a female screw (71) obtained in the slide (7), in such manner to allow for a linear translation of the slide (7) along the axis (Z) of the screw.

Numerous variations and modifications can be made to the present embodiments of the invention, within the reach of an expert of the field, while still falling within the scope of the invention.

The invention claimed is:

1. A door closing device comprising:
   a box;
   a rototranslating pin mounted in said box so as to rototranslate around an axis that coincides with an axis of said rototranslating pin, said rototranslating pin having a head;
   an ejection spring bearing on said rototranslating pin;
   a heart-shaped cam pivotally mounted in said box, said heart-shaped cam having tracks defining a substantially heart-shaped closed circuit;
   a rocker pivotally mounted in said box, said rocker having a pivot axis orthogonal to the axis of said rototranslating pin, said rocker having a fork disposed at a first end of said rocker that engages with said rototranslating pin, said rocker having a follower disposed at a second end of said rocker that slides in the tracks of said heart-shaped cam, wherein rocker is completely rigid and not flexible, said rocker being pivotally mounted in said box so as to form a clearance such that said rocker is translatable along the pivot axis so that the follower follows the tracks of said heart-shaped cam; and
   a spring disposed between a lateral wall of said box and said rocker so as to compensate for and dampen the translation of said rocker along the pivot axis.

2. The door closing device of claim 1, said rocker comprising:
   a rod;
   a first shank; and
   a second shank, said first shank and said second shank protruding from said rod in opposite directions along the pivot axis of said rocker, said first shank and said second shank being revolvingly engaged respectively in a first seat and a second seat respectively at an intermediate well of said box and in the lateral wall of said box, the first seat and the second seat allowing translation of shanks of said rocker along the pivot axis of said rocker.

3. The door closing device of claim 2, wherein said spring is disposed in the second seat and urges against one of the shanks of said rocker.

4. The door closing device of claim 3, wherein the one of the shanks of said rocker has a recess having that receives one end of said spring.

5. The door closing device of claim 3, wherein another of the shanks of said rocker has a round head, the first seat being round so as to form a spherical coupling between the another of the shanks and the first seat.

6. The door closing device of claim 2, wherein each of the shanks of said rocker has a truncated conical shape.

7. The door closing device of claim 1, wherein the fork of said rocker has a pair of arms, an end of each of the pair of arms has a pin directed toward an interior of the fork, wherein the pair of arms lie in different planes, one of the pair of arms lying in one of the different planes that is lower than another of the pair of arms in another of the different planes, the pins being engaged in a semi-annular groove of a helical shape in said rototranslating pin.

8. The door closing device of claim 2, wherein the fork of said rocker has a pair of arms, a thickness of the pair of arms being substantially identical to a thickness of the rod of said rocker.

9. The door closing device of claim 1, said rocker being of a single piece.

10. The door closing device of claim 9, said rocker being formed of a metallic material.

\* \* \* \* \*